| United States Patent [19] | [11] Patent Number: 4,497,883 |
|---|---|
| Murray | [45] Date of Patent: Feb. 5, 1985 |

[54] BATTERY HAVING CATHODE OF SHEET LOADED WITH GRAPHITE AND CARBON SHEET ANODE

[75] Inventor: James G. Murray, East Brunswick, N.J.

[73] Assignee: Mobil Oil Corporation, New York, N.Y.

[21] Appl. No.: 489,872

[22] Filed: Apr. 29, 1983

[51] Int. Cl.$^3$ ............................................. H01M 10/40
[52] U.S. Cl. ..................................... 429/194; 429/218
[58] Field of Search ............... 429/209, 218, 105, 194, 429/101, 195, 197

[56] References Cited

U.S. PATENT DOCUMENTS

| 3,551,205 | 12/1970 | Fraioli et al. | 429/218 |
| 3,844,837 | 10/1974 | Bennion et al. | 429/218 |
| 4,009,323 | 2/1977 | Bennion et al. | 429/194 |
| 4,020,248 | 4/1977 | Boebel | 429/218 |
| 4,091,152 | 5/1978 | Rao et al. | 429/194 |

*Primary Examiner*—Donald L. Walton
*Attorney, Agent, or Firm*—Alexander J. McKillop; Michael G. Gilman; Edward J. Trojnar

[57] ABSTRACT

Rechargeable secondary battery comprising a cathode of a sheet loaded with graphite, an anode of a sheet containing high surface area carbon, and an electrolyte. The sheets can be prepared using a binder such as paper pulp and can be formed on paper making equipment.

10 Claims, No Drawings

BATTERY HAVING CATHODE OF SHEET LOADED WITH GRAPHITE AND CARBON SHEET ANODE

BACKGROUND OF THE INVENTION

A variety of rechargeable storage batteries based on electrodes prepared from organic polymers capable of use in sheet form are known. Such batteries have a potential for outperforming batteries in commercial use and may develop to the point where they are considerably less expensive than existing batteries. However, stability and fabricability problems are associated with many of the proposed polymeric electrode materials. In accordance with this invention cheap and easily fabricable electrodes can be made in sheet form for various applications.

SUMMARY OF THE INVENTION

This invention relates to batteries which comprise a cathode of a conductive sheet containing graphite, an anode of a conductive sheet containing high surface area carbon and an electrolyte.

DETAILED DESCRIPTION OF THE INVENTION

The essential component of the cathode of the battery of this invention is graphite. The graphite is present in sufficient amounts or with other conductive materials so that the graphite containing sheet is electrically conductive even though a non-conductive binder may be present. For example, an effective and preferred binder for the electrodes of this invention is paper pulp. With high loadings of graphite or other forms of carbon the pulp sheet can be made electrically conductive. Accordingly, a composition comprising about 2 parts graphite, 1 part carbon fiber and 1 part pulp can be formed into sheets suitable for the cathode of the battery of this invention. Such sheets can be prepared economically on paper making equipment.

The essential component of the anode in accordance with this invention is high surface area carbon. The high surface area carbon can be in any form such as fibers or particles. The high surface area carbon can also be bound together with a non-conductive material such as paper pulp, with or without other conductive materials such as carbon fibers, to give a conductive sheet suitable as the anode. Again the sheet with pulp as the binder can be produced on paper making equipment.

The binder for the graphite particles of the cathode and for the carbon particles of the anode can be of any suitable material including paper pulp as already described, conductive polymers and even non-conductive polymers. The essential requirements are that loadings of the conductive components be sufficient to render the final sheet conductive and that an effective proportion of the graphite and carbon be accessible to contact by electrolyte.

Various graphite materials tested differ greatly in their effectiveness for use in the cathode. The effective materials had the metallic sheen associated with a visible plate composition of the particles. Accordingly, suitable graphites will be referred to as "plate graphites". Particularly effective materials are Alfa Products—20 to +60 mesh graphite, Asbury Graphite Co., Grade 260, and J. C. Penney powdered graphite lubricant. Two graphites which did not exhibit the metallic sheen, Alfa Products P325 mesh graphite and Alfa Products graphite fibers were not entirely satisfactory.

The high surface area carbon suitable for the anode of this invention generally exhibits a specific surface area of 300 to 2,500 $m^2/g$.

A variety of carbon and graphite fibers are known and a number of them are commercially available. These are generally considered suitable for inclusion into the sheet material of the cathode, the anode, or both.

Carbon fibers can be prepared by dispersing pulp fibers in an organic solvent such as toluene to separate the fibers, drying, and pyrolyzing the fibers. Prepared in this manner, the fibers can be formed into a high bulk mat with the incorporation of the necessary graphite for the cathode or the necessary activated carbon of the anode.

The electrolyte is not an essential part of this invention which resides in the nature of the electrodes. However, non-aqueous electrolytes are preferred. Suitable electrolytes include lithium salts such as lithium perchlorate, lithium fluoroborate and lithium hexafluorophosphate. The electrolyte is dissolved in a suitable non-aqueous solvent such as propylene carbonate in a concentration of 10–30 percent by weight.

The invention is illustrated by the following non-limiting examples.

EXAMPLE 1

Handsheets were prepared using the indicated amounts of pulp, carbon fiber and graphite for the cathode; and pulp, activated carbon and carbon fiber for the anode. The resulting sheets weighed about 20 $mg/cm^2$. Electrodes were cut from these sheets having an area of 3.5 $cm^2$.

For formation of a cell the components were oven dried and sandwiched between glass cover slides with Scott Microwipes as separators and the electrolyte solution syringed onto the cell to saturate the cell. The cells were evaluated under a nitrogen blanket. The results are reported in Table 1.

The cell charge-discharge cycle was controlled by a Research Incorporated 'Data Trak' on-off relay. The charge cycle was 30 minutes through 275 ohm ballast resistor with 3.2 volt battery. The discharge cycle was 30 minutes through 275 ohm resistor.

Cathode 35 mg. Alpha Products—20 to +60 mesh graphite
17 mg. carbon fiber
17 mg. Whatman Filter Pulp
Area—3.5 $cm^2$

Anode 70 mg. Norite A—activated carbon
35 mg. carbon fiber
35 mg. Whatman Filter Pulp
Area—7.0 $cm^2$ (two 3.5 $cm^2$ sheets)

Electrolyte 20 weight percent lithium perchlorate in propylene carbonate

Cell Weight about 0.5 g. (Anode, cathode, separator, solvent and electrolyte)

TABLE 1

Cell Output Initial

|  | Volts | Milliamps | Milliwatts |
|---|---|---|---|
| Initial | 2.3 | 8.5 | 19.5 |
| At 9.6 minutes | 1.4 | 5 | 7.0 |

Cell Output After 203 Cycles

|  | Volts | Milliamps | Milliwatts |
|---|---|---|---|
| Initial | 1.9 | 6.8 | 12.9 |
| At 9.6 minutes | 0.94 | 3.4 | 3.2 |

Cell Efficiency - Initial Cycle

| Cell Output Power | 7.5 watt-seconds |
|---|---|
| Cell Charging Power | 10.5 watt-seconds |
| Watt-hr. Efficiency | 70% |

Cell Capacity

For electrodes + electrolyte solution + separator 0.5 g $$\frac{2.1 \times 10^{-3} \text{ watt-hrs}}{0.5 \times 10^{-3} \text{ Kg}} = 4 \text{ watt-hrs/Kg.}$$

EXAMPLE 2

In a similar manner to that described in Example 1 another battery was made and evaluated as indicated below.

Electrolyte

15% lithium hexafluorophosphate(V) in propylene carbonate

Cathode 58 mg. Graphite (Asbury Graphite Co. Grade 260)
14 mg. Pulp
Cathode Area—2.7 cm$^2$

Anode 52 mg. Activated Carbon (Norite A)
25 mg. Carbon Fiber
25 mg. Pulp
Anode Area—5.4 cm$^2$ (2 sheets each 2.7 cm$^2$)

Cell Weight (Anode+Cathode+Separator+Solvent and Electrolyte) approx.=0.42 g.

Charge Cycle 18 hours through 2,000 ohms ballast resistor with 3.2 volt battery. Discharge 3.25 hours through 2,000 ohms resistor.

Cell Output (First Cycle)

|  | Volts | Milliamps | Milliwatts |
|---|---|---|---|
| Initial | 1.89 | 0.94 | 1.77 |
| Average | 1.41 | 0.70 | 0.99 |
| At 3.25 hrs | 0.7 | 0.35 | 0.21 |

Cell Capacity — 0.99 Mwatts × 3.25 hrs = 3.21 MWhrs $$\frac{3.21 \text{ MWhrs}}{0.42 \times 10^{-3} \text{ Kg.}} = 7.7 \text{ Whrs/kg.}$$

Although the present invention has been described with preferred embodiments, it is to be understood that modifications and variations can be resorted to without departing from the spirit and scope of this invention, as those skilled in the art will readily understand. Such variations and modifications are considered to be within the purview and scope of the appended claims.

What is claimed is:

1. An apparatus which is capable of being electrically charged to obtain a rechargeable battery, said apparatus comprising a conductive sheet containing particles of graphite, a conductive sheet containing high surface area carbon, and an electrolyte comprising a metal salt and a non-aqueous solvent; in which said graphite containing sheet is the cathode and said high surface area carbon is the anode in the battery in its charged state.

2. The battery of claim 1 in which said electrolyte comprises lithium perchlorate.

3. The battery of claim 1 in which the electrolyte comprises lithium fluoroborate.

4. The battery of claim 1 in which said electrolyte comprises lithium hexafluorophosphate.

5. The battery of claim 1 in which said electrolyte is a solution of lithium perchlorate, lithium fluoroborate or lithium hexafluorophosphate in propylene carbonate.

6. The battery of claim 1 in which said sheets include paper pulp as a binder.

7. The battery of claim 1 in which said sheets include organic polymer as a binder.

8. The battery of claim 1 in which said sheets include conductive organic polymer as a binder.

9. The battery of claim 1 in which said cathode comprises graphite bound with paper pulp and said anode comprises high surface area carbon bound with paper pulp.

10. The battery of claim 1 in which said cathode comprises graphite and carbon fibers bound with paper pulp and said anode comprises high surface area carbon and carbon fibers bound with paper pulp.

* * * * *